United States Patent [19]

Fothergill

[11] Patent Number: 4,950,898

[45] Date of Patent: Aug. 21, 1990

[54] METHOD OF POSITION MONITORING AND APPARATUS THEREFOR

[75] Inventor: Ian R. Fothergill, Davyhulme, United Kingdom

[73] Assignee: United Kingdom Atomic Energy Authority, London, England

[21] Appl. No.: 270,021

[22] Filed: Nov. 14, 1988

[30] Foreign Application Priority Data

Nov. 30, 1987 [GB] United Kingdom ............... 8727963
Aug. 11, 1988 [GB] United Kingdom ............... 8819118

[51] Int. Cl.$^5$ ............................................. G01B 15/06
[52] U.S. Cl. .................................. 250/390.01; 356/32; 378/70; 73/801
[58] Field of Search ................. 250/390.06, 390.01, 250/390.12; 356/32, 35, 35.5; 378/70, 86, 72; 73/800, 801

[56] References Cited

U.S. PATENT DOCUMENTS

| 3,985,444 | 10/1976 | Takashima et al. | 356/32 |
| 4,525,068 | 1/1985 | Mannava et al. | 356/35.5 |
| 4,605,857 | 8/1980 | Ninomiya et al. | 250/372 |
| 4,854,709 | 8/1989 | Nehnert et al. | 356/375 |

FOREIGN PATENT DOCUMENTS

| 0024884 | 3/1981 | European Pat. Off. |
| 0214046 | 3/1987 | European Pat. Off. |
| 8302667 | 8/1983 | PCT Int'l Appl. | 356/437 |
| 2045920 | 11/1980 | United Kingdom . |
| 2150384 | 6/1985 | United Kingdom . |
| 2151778 | 7/1985 | United Kingdom . |

Primary Examiner—Janice A. Howell
Assistant Examiner—Richard Hanig
Attorney, Agent, or Firm—William R. Hinds

[57] ABSTRACT

Displacement or strain is measured by applying to a body to be monitored at least one grid line (two or more where strain measurements are required) and scanning a radiation beam such as a laser beam across or partly across the grid line(s) to produce a pulsed output from which the mean position(s) of the grid line(s) can be ascertained with reference to a datum point on the beam scanning path. Displacement of each grid line relative to the datum point can be determined. The beam scan may be adjustable to produce a null condition in which the mean position of the grid line(s) coincides with the mid-point of the beam scan. Any deviation from the null condition then indicates displacement of the body or strain thereof.

33 Claims, 6 Drawing Sheets

METHOD OF POSITION MONITORING AND APPARATUS THEREFOR

This invention relates to a method and apparatus for position monitoring, for example in-plane surface displacements of a body produced by surface strain or possibly cracks, such as surface cracks or cracks buried within the body.

According to a first aspect, the invention relates to a method of monitoring the position of at least one target, the method generally comprising repeatedly scanning a beam of radiation across the target, receiving reflected radiation from the target, and analysing the reflected radiation to determine any change in position of the target.

In a preferred embodiment, the method of the invention includes scanning the beam at a predetermined frequency relative to a datum axis such that the scanned beam traverses a target on said body twice per cycle of scan and produces corresponding pulses of reflected radiation therefrom, receiving the time-separated pulses at a detector means, adjusting the datum axis, if necessary, to render the received pulses substantially symmetrical in time, recording the adjusted position of the datum axis associated with the target, subsequently repeating the scan of said target with the scanning datum axis in said adjusted position and detecting any loss of symmetry of the pulses received by the detector means.

The displacement associated with the body may comprise translational and/or angular displacement of the body as a whole or in-plane surface displacements on the body.

Where the method is to be used in the monitoring of in-plane surface displacements, the body may be provided with a plurality of targets distributed in parallel relationship over a surface of interest and the targets are initially scanned individually to derive an adjusted scanning datum axis for each target, each adjusted datum axis position is recorded, and subsequently each target is scanned periodically with the scanning datum axis in the adjusted position initially derived for the respective target. In this way, the surface strain field can be monitored by periodically performing scans of the targets.

The targets may comprise a series of grid lines applied to the surface of interest, or mutually perpendicular lines.

The radiation beam conveniently comprises light, for example a laser beam, and a scanning motion might be imparted by means of an angularly driven optical element, for example an oscillating mirror, or a pair of mirrors mounted on a rotating carrier so as to describe an orbital scan of the laser beam. The mean position of oscillation or rotation of the mirror or mirrors defines the datum axis of the beam scan and adjustment of the position of the datum axis can be effected by appropriate adjustment of the mirror or mirrors.

In one embodiment of the invention, there is provided a method of monitoring the position of at least one target on a body, the method comprising projecting a beam of radiation onto a deflector arranged such that the radiation is deflected by the deflector onto the body, repeatedly angularly moving the deflector about a datum axis in a cyclic manner so that the deflected radiation is cyclically scanned across the target and reflected therefrom, receiving the reflected radiation from the target, and analysing the reflected radiation to determine any change in position of the target.

According to a feature of the invention, symmetry detection is implemented by a frequency analysis of the output of the detector, the datum axis of the scanned beam being adjusted to determine the position of adjustment at which the output of the detector means is a minimum over a narrow frequency band containing the frequency of scanning. For example, the output of the detector means may be applied to a narrow band filter tuned to the scanning frequency.

The general method may monitor the position of two targets on a body by repeatedly scanning a beam of radiation across the targets but such that the path of the scan does not completely traverse each target, changes in position of the targets relative to each other resulting in changes in reflected radiation pulses from at least one of the targets, receiving reflected radiation from the targets, and analyzing the reflected radiation, the analysis including comparing the amplitudes of neighboring reflected radiation pulse energies to derive the degree of asymmetry of the targets from the initial position of the targets so as to determine any change in position of the targets.

The general method may also be used in monitoring the position of two targets on a body, by repeatedly scanning a beam of radiation across the two targets but such that the path of the scan does not completely traverse each target, changes in position of the targets relative to each other resulting in changes in reflected radiation pulses from at least one of the targets, receiving the reflected radiation pulses, analysing the reflecting radiation pulses, and subsequently adjusting the datum central position of the scan until the same reflected radiation is received from each target to derive the change in position of the targets.

In a second aspect the invention relates to apparatus for carrying out the method or methods of the first aspect, the apparatus generally comprising means for directing a beam of radiation towards at least one target, means for repeatedly scanning the beam across the target, means for detecting reflected radiation from the target, and means for analysing the reflected radiation to determine any change in position of the target.

The beam of radiation might comprise, light, neutrons, x-rays, or ultrasound.

In one form of the apparatus of the second aspect of the invention there i provided means for directing a beam of radiation towards at least one target on a body, means for scanning the beam at a predetermined frequency across the target on the body, detector means for receiving reflected radiation from the target whereby the detector means receives two time-separated refleoted pulses from the target per cycle of scan, means responsive to the detector means for adjusting the mean position of scanning until the received reflected pulses are substantially equispaced timewise, means for recording the adjusted mean position associated with the target whereby the mean position necessary, in a subsequent scan of the target, to attain the equispaced relation of the received pulses can be compared with the recorded mean position, thereby to detect any displacement of the target.

Preferably the adjusting means is frequency selective and is responsive to the component of the detector means output having a frequency content corresponding to said pre-determined scanning frequency. In one embodiment, the adjusting means includes a narrow bandpass filter tuned to said pre-determined frequency and coupled to receive the output of the detector means.

In one embodiment, apparatus for monitoring the position of at least one target on a body comprises means for projecting a beam of radiation, means for deflecting the projected radiation and toward which deflecting means the beam is arranged to be directed, means for repeatedly angularly moving the deflecting means about a datum axis in a cyclic manner so that said deflected radiation therefrom is cyclically scanned across at least one target and is reflected therefrom, means for receiving the reflected radiation, and means for analysing the reflected radiation to determine any change in position of the target. There may be included means splitting the deflected beam of radiation so that each split portion of the deflected beam can be directed at and scanned across a respective target by the annular moving of the deflecting means.

One major advantage of the invention is that as a non-contact method and apparatus it enables strain and displacement to be determined at relatively high temperatures, for example in excess of 700° C., or in hazardous environments where access is restricted.

The invention will now be described further by way of example only with reference to the accompanying drawings in which, FIG. 1 is a schematic view of apparatus for carrying out the method of the invention;

In the above Figures like parts have like numerals.

Figure 1:
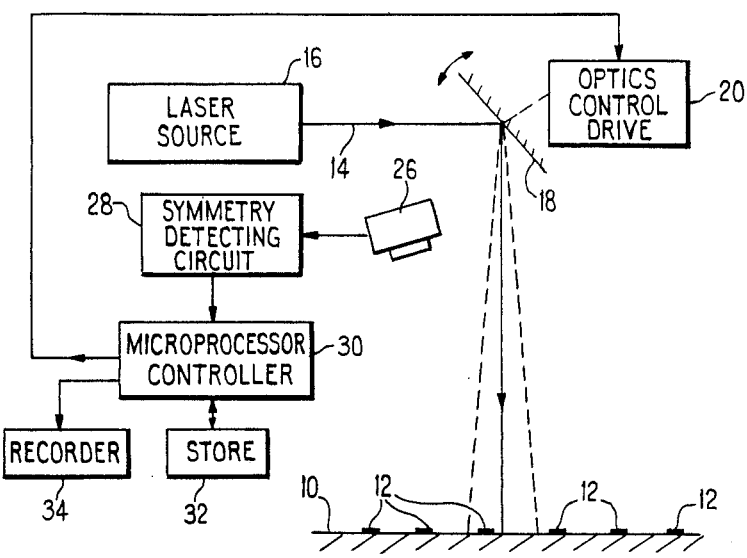

As shown in FIG. 1, the surface 10 of the body to be monitored has applied thereto an optical grid comprising a series of target lines 12 which are shown exaggerated for clarity but may typically comprise a series of diffusely reflecting white lines formed by the application of a high temperature paint (e.g. stable at temperatures above 700° C.) to the surface 10 by standard mask and spray techniques. The grid may for example comprise two sets of mutually orthogonal target lines extending in the plane of the surface with a pitch between adjacent lines of the order of 1 mm. A beam 14 of radiation from a laser source 16 is projected onto the surface 10 by a mirror 18 and via standard focussing and collimating optical components which have been omitted for clarity.

The laser beam is caused to execute a scanning motion across the surface. This may be achieved in various ways, e.g. by linear displacement of the source and/or mirror 18 or by angular oscillation of the mirror. In the illustrated embodiment, scanning of the beam is effected by an angularly oscillating mirror driven about an axis normal to the plane of the paper by a control drive unit 20 which produces a drive output having a symmetrical waveform, e.g. sinusoidal. If desired, the scanning may be effected in orthogonal directions by means of a twin axis mirror system in place of the single mirror shown.

Figure 2:
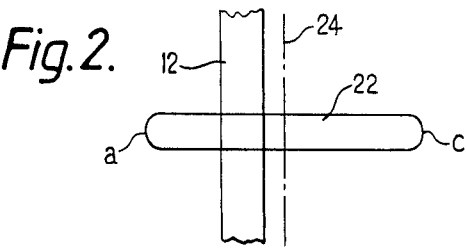
FIG. 2 is a view illustrating the extent of a laser beam linear scan with respect to a target on the surface to be monitored.

The drive waveform amplitude is selected so that the extent of the scan at the surface 10 is only across one grid line 12. FIG. 2 illustrates diagrammatically the scanning of the beam spot across one of the grid lines 12. The limits of the scan path 22 are indicated by references a and c and the mean position of the beam during each such scan is indicated by the centre line 24. The lines 12 when scanned by the beam reflect the laser radiation and a suitable detector 26 is located to receive the pulses reflected each time the beam traverses the lines 12.

Figure 3:
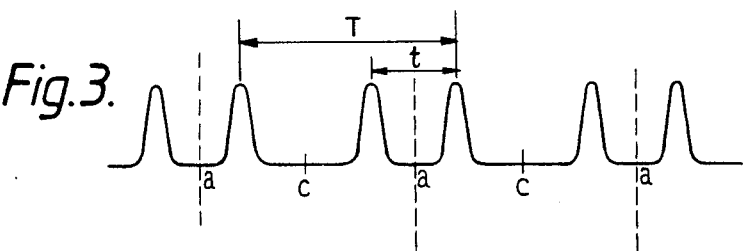
FIGS. 3 and 4 illustrate pulse trains obtained for different mean scanning positions of the laser beam.

In the situation shown in FIG. 2, it will be seen that the centre line 24 (which in effect represents a mean position or datum axis for the scan) is offset relative to the grid line 12. In the course of each scan the detector receives two pulses as the beam travels from point a to point c and back to a again. FIG. 3 illustrates the pulsed output produced by the detector 26 which consists of a series of pulses in which the intervals between successive pulses differs. In FIG. 3, T represents the delay between alternate pulses produced as the beam sweeps in both directions between a and c, and t represents the interval between pulses as the beam sweeps from c to a and back towards c. T is also equal to the inverse of the frequency of scan of the beam.

Figure 4:
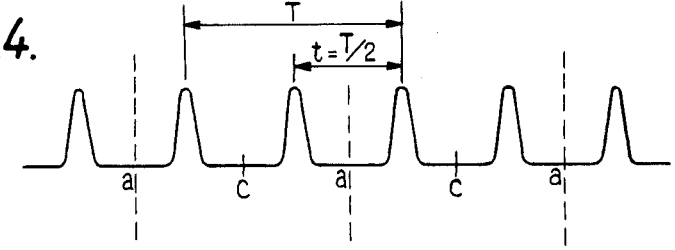

By adjusting the mean position or datum position of the scan by appropriate adjustment of the mean position of the angular oscillation of the mirror 18, the centreline 24 can be brought into coincidence with the medial axis of the target line 12 and, in this event, the pulsed output of the detector 26 will be as shown in FIG. 4 where all of the pulses are spaced at equal intervals such that $t = T/2$. The coincident position can thus be located by analysing the output of the detector, as the beam datum position is varied, in order to determine when the symmetrical pulse output condition of FIG. 4 prevails.

In practice, this can be readily implemented by a frequency analysis technique for example using a frequency analyser or a narrow band filter tuned to the scanning frequency, i.e. the frequency of oscillation of the mirror 18. When the coincidence condition prevails, the detector output over a narrow band of frequencies centred on the scanning frequency will be at a minimum compared with non-coincident conditions. As shown schematically in FIG. 1, the output of the detector 26 is applied to a symmetry detecting circuit 28 including for example a narrow band filter tuned to the scanning frequency and the circuit 26 produces a signal representing the frequency component of the detector output over a narrow band (e.g. ~10 HZ) centred on the scanning frequency. This signal is monitored by a microprocessor-based controller 30 which controls the drive unit 20 in order to adjust the beam datum position (ie the mean scanning position) until the signal from the circuit 28 reaches a minimum. This controller 30 then registers the corresponding mean scanning position and stores appropriate data for the grid line examined in store 32.

The procedure is repeated at different positions over the optical grid so that the store contains a record of all of the mean scanning positions for each grid position monitored from which separation of neighbouring grid lines can be deduced. The procedure is repeated subsequently in order to monitor for changes in grid line separation as a result of for example crack-induced in-plane surface displacements. Such changes will manifest themselves if the relative mean scanning positions required to achieve the coincident conditions for each pulse differ from the relative mean scanning positions initially derived and stored in the store 32. The controller 30 drives a recorder 34, e.g. a display and/or printer, for recording the relative positions of the lines of the grids obtained during each scan of the grid.

The procedure can be arranged to scan (preferably uniformly) across two or more lines 12, to produce corresponding pulses from which the time delay 't' between the pulses can be deduced. Any change in the position of the lines 12 due to strain or surface displacement (e.g. cracks) will result in a change in the time delay 't' from which the strain or displacement can be deduced by pulse timing analysis. Any common mode effects, for example natural convection currents, can be made negligible by choosing scan periods significantly smaller than the time constants associated with the common mode effects.

The apparatus of FIG. 1 with a linear scan is sensitive to displacements in the direction of scan. To measure displacements in three orthogonal directions, three independent scans must be employed each with a resolved component in the displacement direction. The inclination or topology of the target line surface has negligible effect on measurement accuracy. For strain measurement the procedure is independent of topology or inclination so long as these remain constant. If either of these change then more than one scan direction must be employed with non-parallel beam datum axes. If lateral scans are employed, ie no angular separation of the beam datum axes at scan limits, then the procedure is insensitive to surface movement in a direction normal to the beam datum axis.

If any movement is likely to cause a change in scattered energy at the detector 26 then it is preferable to employ the above-mentioned pulse timing analysis rather than symmetry methods.

Figure 5:
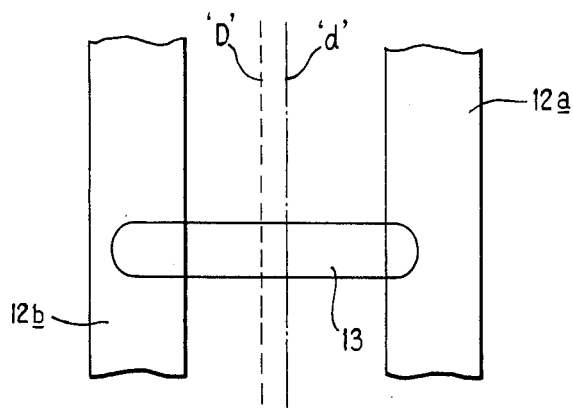
FIG. 5 is a modification of the view of FIG. 2.
Figure 6:
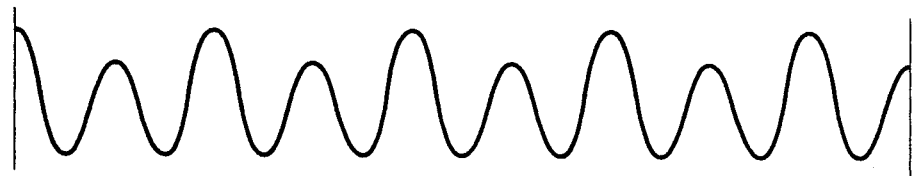
FIGS. 6 and 7 illustrate pulse trains from the modification of FIG. 5.

In a modified procedure shown in FIG. 5 for scanning between two lines 12a, 12b the path of the scan shown as 13 in FIG. 5 is arranged so that it does not completely traverse the lines 12a, 12b. When the datum position 'D' of the scan coincides with the mid-point 'd' between the lines 12a, 12b, the same amount of light is scattered from each line 12a, 12b. Any deviation from this coincidence position of 'D' and 'd' results in more light being scattered from one line 12a or 12b than the other line 12b, or 12a. Hence different scattered light pulse integral energies will be received by the detector 26, and the difference between the amplitudes of neighbouring pulses (see FIG. 6) will be a measure of the degree of asymmetry from the original midpoint.

Figure 7:
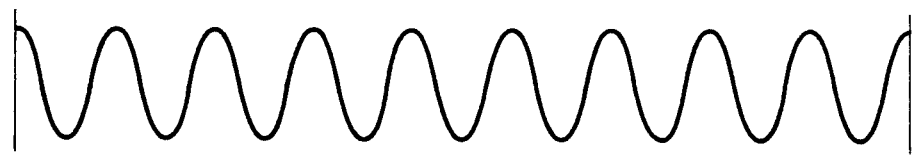

Symmetry may be re-established (see FIG. 7) by appropriate movement of the mirror 18, from which the mean displacement of the grid lines 12a, 12b can be deduced.

The integrated scattered pulse energy will be dependent upon the degree of overlap of the scan 13 and grid lines 12. If strain occurs then the grid lines 12 will move farther apart causing a reduction in detected pulse amplitude. By monitoring the area of these pulses (amplitude × time), the RMS value, or their peak height over several pulses, a measure of the degree of grid line 12 separation, and hence strain can be deduced.

In order to correct for any changes in grid line 12 reflectivity or laser beam intensity, both of which affect the scattered pulse amplitude, the laser scan 13 can be uniformly extended beyond the outer limits of the grid lines 12, the unfiltered resultant scattered light pulse amplitudes (from each line 12) now being independent of the grid line 12 separation and hence strain but dependent upon the grid line 12 reflectivity and laser beam intensity.

Although the invention has been described in relation to oscillatory movement of the laser beam, the mirror 18 may be driven continuously using a precision motor drive such as a synchronous motor or a stepping motor (not shown). A single line 12 would yield a corresponding scattered light pulse as the laser beam passes over the line 12. This would occur once each revolution for a single sided mirror 18 or twice for a double sided mirror. If the angular position of the mirror 18 is accurately known, by the inclusion of a suitable angular transducer on the motor drive shaft for example, then the spatial location of the line 12 may be deduced from a knowledge of this angular position when the scattered light pulse is generated.

For strain measurement at least two lines 12 are required and the scattered light pulses from each line 12 detected, and the time delay between the pulses monitored using precision timing equipment. From this delay and a knowledge of the angular velocity of the mirror drive shaft, and the separation of the lines 12 from the mirror 18 (the latter two controlling the laser beam scan velocity across the lines 12) the separation of the lines 12 can be deduced, and corresponding strain or compression obtained.

By including an angular transducer on the mirror 18 drive, any common mode movement (i.e. body movement) of the lines 12 with respect to the mirror drive can be deduced.

Alternatively, if the motor is an ac synchronous motor, or a stepping motor, the angular position of the drive shaft corresponding to the scattered light pulse can be deduced from the motor drive signal, and the line 12 position with respect to the mirror 18 drive again deduced.

More than two reflecting mirrors 18 may be used, for example, on the faces of a hexagonal or other polygonal rotary body, with the body being rotated so as to repeatedly scan a light beam across target lines. It will be appreciated that the light beam may be passed through fibre optical filaments, and scanning achieved by physical movement of the filaments or optical reflector, or by switching across a coherent fibre optical bundle. The use of fibre optical lines has advantages when the path between the mirror 18 or reflector and the grid line 12 is non-linear or opaque and may be aided by use of conventional optical devices such as prisms and lenses.

Figure 8:
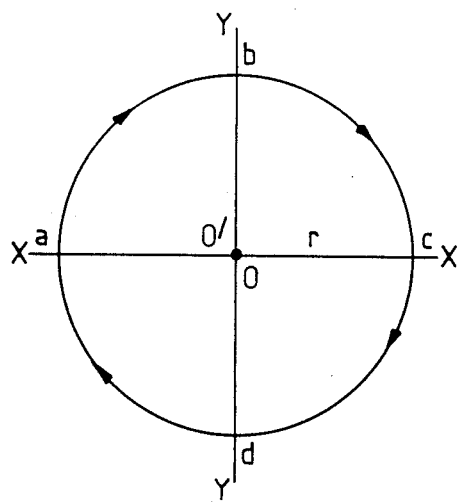
FIGS. 8 to 14 show orbital-laser scans used for the method of the invention.
Figure 9:
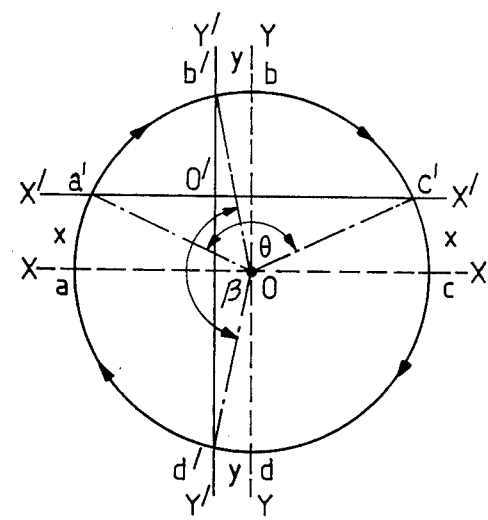

Instead of the use of a linear scan of the laser beam, a two-dimensional such as an orbital scan may be used, for example around two mutually perpendicular lines on a surface as shown in FIGS. 8 and 9 to which reference is made.

In FIG. 8 a laser beam has a datum axis 0 of a circular scan pattern at a radius 'r' in the direction shown by the arrows that coincides with the intersection point $O^1$ of two mutually perpendicular target lines X—X, Y—Y respectively.

Figure 8A:
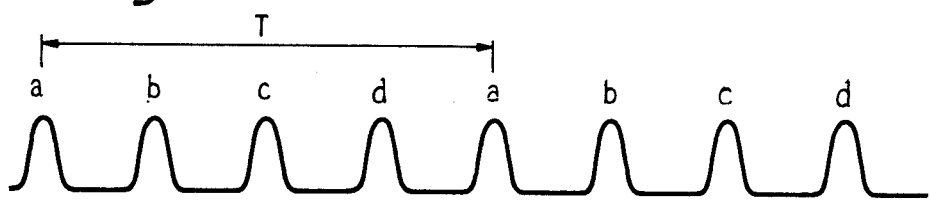

As the laser beam passes over the lines X—X, Y—Y a uniform sequence of scattered light pulses will result at a, b, c, d with a frequency of 4 times the scan frequency at a period T, see FIG. 8a.

Figure 9A:
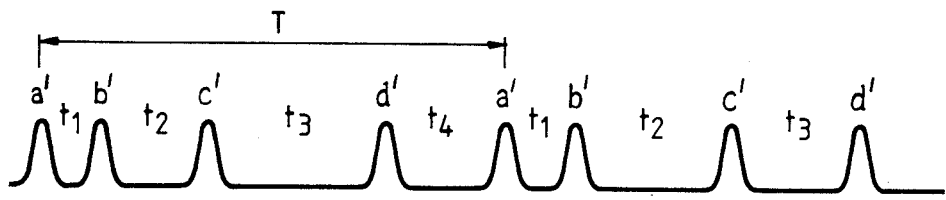

Any departure from the above coincident condition of $O^1$ and 0 as shown in FIG. 9, will induce a nonuniform pulse sequence with '4 pulse' groupings $a^1$, $b^1$, $c^1$, $d^1$ recurring at the scan frequency, and separated by respective time intervals $t_1$, $t_2$, $t_3$, $t_4$, see FIG. 9a. Low pass or narrow band filtering of the detected signal at this frequency will yield a finite component having an amplitude which will increase with the degree of axial-asymmetry. For the symmetrical or coincident case of FIG. 8, this scan frequency component will be zero or a minimum. The displacement of the intersection point $0^1$ can be deduced from the mean displacement of the laser beam 0 necessary to re-establish coincidence of 0 and $0^1$.

Alternatively any displacement of $0^1$ can be deduced by timing the scattered light pulses and comparing the delays between consecutive pulses with each other within a 4 pulse group, or with the scan period, i.e. the time for a complete rotation of the laser beam. As shown in FIG. 9, the displacement of the target lines X—X, Y—Y with respect to the coincident position of $0^1$ and 0 is represented by 'x', 'y' respectively. Then 'x' is given by:

$$x = r \cos \theta/2$$

where $\theta$ is the angle swept as the scan passes from $a^1$ to $c^1$.

$\theta$ can be deduced directly from the pulse sequence in FIG. 9a and is given by:

$$\theta = 2\pi \frac{(t_1 + t_2)}{T}$$

$$\text{thus } x = r \cos\pi \frac{(t_1 + t_2)}{T}$$

Similarly, if $\beta$ is the angle subtended by $d^1$, $b^1$, then the displacement 'y' is given by:

$$y = r \cos \frac{\beta}{2}$$

which can be expressed in terms of pulse period delays, $$\text{thus 'y'} = r \cos\pi \frac{(t_1 + t_4)}{T}$$

Hence 'y' and 'x' can be deduced directly from a knowledge of the circular orbital scan radius 'r', and a knowledge of the time delays between consecutive pulses which can be readily derived using standard timing apparatus.

It is important to generate a symmetrical two-dimensional scan, and this may be achieved in a number of ways. One way would be to employ twin orthogonal axis mirrors (not shown) driven from a common sine wave signal but with a $\pi/2$ relative phase shift.

Figure 10:
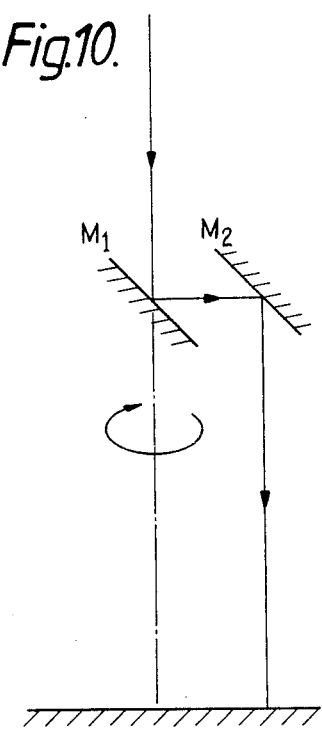

Alternatively as shown in FIG. 10, a double mirror arrangement $M_1$ $M_2$ with no relative movement could be employed, with the rotation of the mirrors $M_1$ $M_2$ about an axis through the incident laser beam datum axis generating a circular scan.

The orbital scan procedure of FIGS. 8 and 9 is sensitive to movement in the plane normal to the beam datum axis. If the normal to the surface is inclined to the beam datum axis then the resolved component of the intersecting target lines $a^1c^1$, $b^1d^1$, may no longer be orthogonal. To remove ambiguities more than one scan beam datum axis angle can be employed and displacement measurements made using pulse timing analysis rather than symmetry methods.

The orbital scan procedure of FIGS. 8 and 9 has advantages in that it enables displacement in two dimensions to be determined. The use of a single line b'd' or a'c' may be used when displacement in only a single direction is to be detected. The displacement can then be deduced in a similar manner to that described in relation to FIGS. 8 and 9, since a sequence of two light pulses will be produced in each scan, and can be subjected to low pass or narrow band filtering, or to timing analysis.

Figure 11:
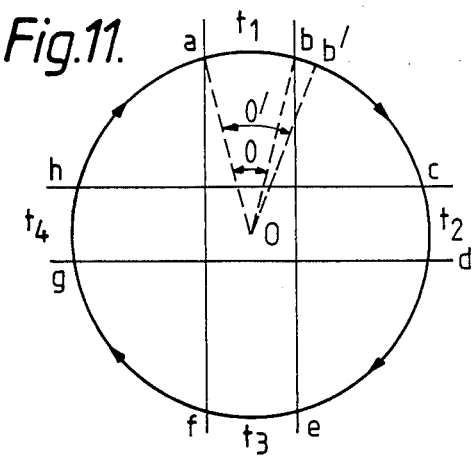
Figure 12:

When strain is to be determined using an orbital scanning procedure the use of double lines can be used as shown in FIG. 11. In FIG. 11 a laser beam has a circular scan pattern produced in the manner of FIG. 10 and in the direction shown by the arrows from a datum point 0. The scan passes across parallel lines a f and b e, and parallel lines c h and g d at the same spacing and which intersect and are perpendicular to lines a f and b e. The pulses made by the scan as it crosses between a b, c d, e f, g h, are represented by $t_1$, $t_2$, $t_3$, $t_4$ respectively, the pulse sequence produced in a complete scan in symmetrical conditions being shown in FIG. 12. The strain of a body on which the lines a f, b e, c h and d g are mounted, can be deduced from the changes in the delay between successive pulses, and should be carried out under symmetry conditions. This is indicated by uniformity of the time between pairs of pulses, and is brought about by moving the datum point 0 until uniformity of the timing is reached. Then if the angle generated by the scan between two lines, say a, b is $\theta$ at the start but due to strain of the body increases to $\theta^1$ as b moves to $b^1$, for small angles of $\theta$ the strain S is represented by:

$$S = \frac{\theta^1}{\theta} - 1$$

and is in the direction h c or g d.

In a similar manner strain in the direction of line a f or b e can be determined. Should strain in only one direction be required, one pair of lines a f, b e, or h c, g d can be omitted depending on the direction of strain to be monitored.

Figure 13:
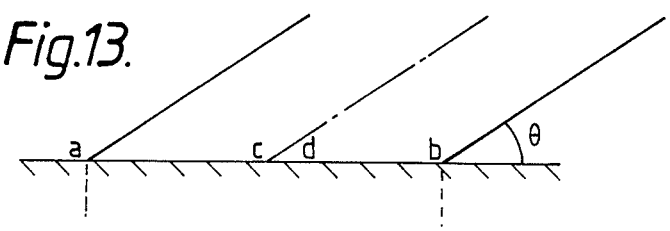

In another example of an orbital scan, the scan could follow a non-circular path such as an elliptical path in which analysis of the results would be similar to that produced by the circular scans of FIGS. 8, 9, 11 and 12. The elliptical scan could be produced by use of orthogonal mirrors (not shown) driven from a common $\pi/2$ phase difference sine wave source, with the drive amplitude of one mirror being different from that of the other mirror so as to generate the ratio of the axes of the ellipse. Such mirrors are available for example from Automatic Systems Laboratories Ltd, Milton Keynes, United Kingdom. An elliptical scan for a given perimeter of scan may have relatively low sensitivity to common mode effects near to the beam minor axis and in the direction normal to the target lines along the surface of the body upon which the lines are superimposed. Common mode effects may also be minimised by averaging of the time between pulses. Alternatively the arrangement shown in FIG. 10 may be used to derive an elliptical scan, by inclining the axis of rotation of the mirrors $M_1$ $M_2$ to the target at some angle $\theta$ as shown in FIG. 13.

Figure 14:
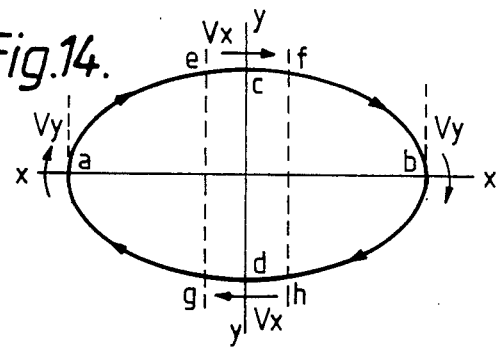

The image spot velocity in this case will not be constant as the spot describes the elliptical path but is readily predictable. For example as shown in FIG. 14, the tangential velocity $V_y$ at the interception points 'a' and 'b' of the major axis X—X will equal the circular velocity Vc of FIG. 10. However, the tangential velocity Vx at the interception points 'c' and 'd' of the minor axis will be equal to Vc cosec $\theta$ which is always greater than Vc except for a normal incidence angle.

Despite this variation in spot velocity around the ellipse, if symmetry conditions are induced in which the major and minor axes coincide with orthogonal target lines, the resultant pulse sequence will consist of a series of equi-spaced pulses with a repetition rate four times the orbital frequency.

If relative displacement (e.g. strain) is measured under the above coincident conditions by monitoring the delay between consecutive pulses generated by the corresponding target line pairs, no ambiguities will result due to spot velocity variations. If, however, relative displacements are to be measured under uncontrolled absolute displacement conditions, it would be preferable to confine measurements to the low curvature regions of the ellipse, i.e. e, f or g, h, since rates of change of consecutive pulse delays will be least in those regions.

One benefit relative displacement-measurements, using two parallel target lines, have over absolute (e.g. single target line) displacement measurement is that the parallel target lines are less vulnerable to instabilities in the laser scanning optical system as well as showing a low sensitivity to random refractive index changes generated by natural convection currents associated with hot targets. For the single target 'absolute' case the effects of the above instabilities require further signal processing e.g. time averaging etc, to minimise them.

Figure 15:
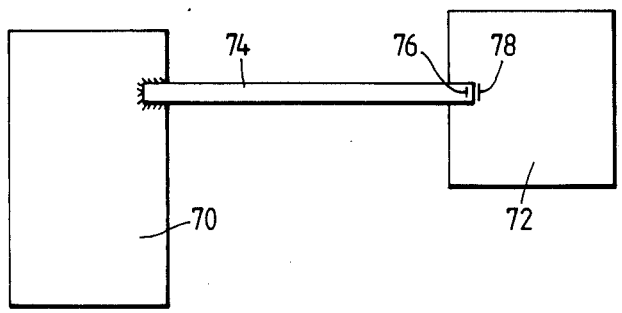
FIG. 15 shows another application of the invention.

The orbital scan procedure may also be used in relation to the procedure of FIG. 5, since the extremities of the scan 13 in FIG. 5 could be produced by an orbital scan of the laser beam. Furthermore as shown in FIG. 15, if relative displacement of two remote structural members 70 and 72 is required to be measured, an additional projected member 74 may be firmly secured at one end to the member 70 and extend so as to overlap the other member 72. A target line 76 superimposed on the projected member 74 is then arranged to lie close to a parallel target line 78 on the other member 72, thus allowing the aforedescribed pulse timing analysis to be employed.

If any of the elements within the laser optical head including the laser itself are in any way unstable or if relative movement existed between these elements, this could cause instabilities in the processed signal.

Lasers are renowned to suffer from some spatial instabilities due to thermal effects which might typically induce a 100 micro radian angular displacement of the laser beam. This would cause a 100 micron lateral displacement of a laser spot incident upon a target located one meter from the laser beam aperture.

It is possible to obtain commercially low powered 'Uniphase' He-Ne lasers having a spatial stability of better than 100 micro radians after initial warming of the laser, so there may well be many applications where the problems of instabilities will not arise. In other applications, or with higher powered laser sources, methods of compensating for laser instabilities may be necessary.

Figure 16:
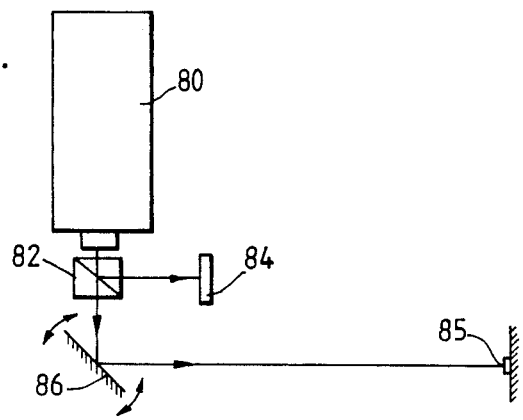
FIGS. 16 and 17 show diagrammatically modifications of the apparatus of FIG. 1.

One such method of compensating for these thermal induced spatial instabilities of the laser beam is shown in FIG. 16 in which an emergent laser beam from a source 80 is split by use of an adjustable beam splitter 82. One fraction of the split beam is directed to a precision position detector 84 e.g. a four quadrant photo sensor. The other fraction of the beam would be deflected by an oscillatory mirror 86 to a target 85. Any lateral displacement of the beam away from a reference condition that corresponds to zero output from the detector 84, generates an output from the detector 84 which is fed to the beam splitter 82 to alter the angular position of the beam splitter 82 and thus return the beam to the reference position on the detector 84. In other respects the apparatus of FIG. 16 operates in a similar manner to the apparatus of FIG. 1.

Figure 17:
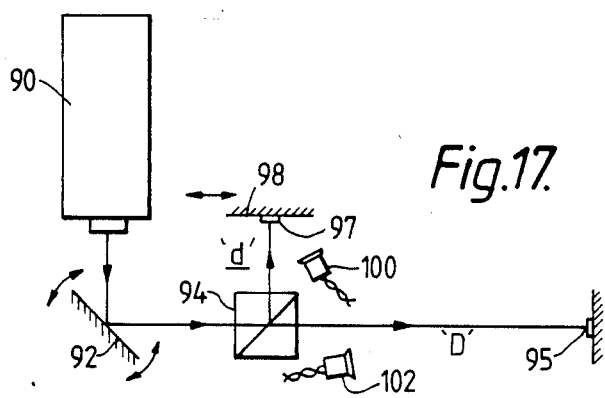

Alternatively the effects of spatial instability (or beam wander) of a laser source could be accommodated using a reference target line as shown in FIG. 17. In FIG. 17 a beam from a source 90 is oscillated by a mirror 92 and split by a beam splitter 94 with 50% passing to a specimen target 95 and 50% of the beam passing to a reference target 97 contained in an optical scanning assembly head 98 and movable laterally.

The separation 'd' of the reference target 97 and the beam splitter 94 could be made comparable with the separation 'D' of the specimen target by known beam folding techniques using multiple reflections from near parallel or parallel mirrors (not shown).

The scattered light pulses from the reference target 97 and the specimen target 95 are detected by a reference detector 100 and a specimen detector 102 respectively. Symmetry conditions are induced for both the reference target 97 and the specimen target 95 by appropriate adjustment of the mirror drive control (not shown) and the reference target 97 controls (not shown). If now the beam wanders from symmetry, then a corresponding signal from the reference detector 100 is fed back to the mirror drive control to restore the original symmetrical condition. If the specimen target 95 is then displaced from its symmetrical condition, then the pulse sequences from the reference target 97 and the specimen target 95 will now differ, and the extent of target line displacement can be deduced from a knowledge of 'd' and 'D' and the adjustment necessary to the reference target 97 to generate identical specimen target 95 pulse sequences.

Although symmetry conditions are readily detectable using low pass filtration methods, etc, in practice it is not necessary to establish the symmetry condition since the specimen target 95 displacement can be deduced directly by comparing the specimen target 95 pulse sequence from the scan with the reference target 97 pulse sequence using timing methods, this procedure being insensitive to any common mode effects such as beam wander. For this system natural convection current effects would not be common to reference target 97 and specimen target 95 pulse sequences from the scan and must therefore be accommodated by time averaging, etc.

The arrangement in FIG. 17 has other applications. It may be used as an alternative to the arrangement of FIG. 15 when it is necessary to monitor displacement of two bodies, with the specimen target 95 located on one of the bodies and another target instead o the reference target 97 on the other body. Displacement of either of the bodies can be detected by the afore-described symmetry or pulse timing methods. This enables the two bodies to be monitored from a single laser source.

Although the invention has been described in relation to the use of a laser beam, other forms of radiation may be used for applications where optical radiation is not appropriate, e.g. through an opaque media. These other forms include ultrasonics, neutron radiation, or X-rays. Such applications would usually involve a line in the form of a discontinuity which will scatter the radiation in a manner different from that of the discontinuity surrounds. By detecting the appropriate scattered radiation pulses resulting from scanning the incident radiation beam across the discontinuity the spatial location of the discontinuity can be defined with respect to the scanning system by analysing the pulses.

When ultrasonics are used in a suitable conducting medium the aforementioned symmetry or single line method of FIG. 2 might be used to monitor in real time structural or component movement or displacement, in for example liquid sodium. In this case a beam of continuous ultrasonic energy generated by an ultrasonic transducer probe could be directed onto a metallic reflector. Focussing or collimation could be achieved by a suitably shaped probe or reflector. Though benefits would result from energy concentration as a 'spot' on the target it is not essential in the symmetry method of FIG. 2 to produce a small 'spot' so long as the beam has a significant central axis maximum.

The target may consist of some natural feature on the structure or component, e.g. a sharp edge or some discontinuity which will scatter incident ultrasonic energy preferentially over its surrounds. Alternatively a target could be imposed on the structure in the form of, for example, a linear projection with cross-sectional dimensions smaller than the radiation wavelength which will cause scattering of the incident radiation rather than geometrical reflections. By positioning an ultrasonic detector off-axis outside any geometrically reflected sound field it becomes sensitive only to scattered radiation and the target position can be defined using the symmetry method.

Figure 18:
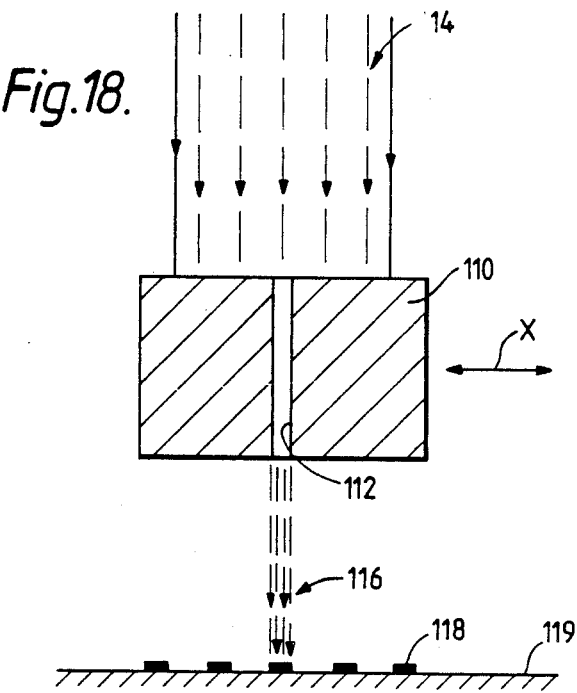
FIGS. 18 and 19 show diagrammatically further alternative apparatus to that of FIG. 1.
Figure 19:
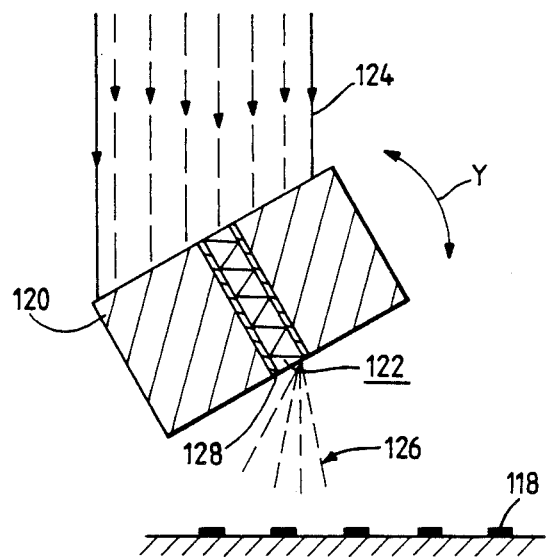

Neutrons can be focussed using neutron Fresnel zone plates, or collimated using a neutron absorber with a suitable aperture as shown in FIGS. 18 and 19. In FIG. 18, a boron shielding block 110 has an aperture 112 through which incident neutron radiation 114 is collimated. Sideways displacement of the shielding block 110 as shown by arrow X causes a uniform neutron beam 116 to be swept across lines 118 (shown exaggerated for clarity) of a material that will interact with incident neutrons in a different way from that of a base surround 119, such that the detected resultant radiation will be characteristic of the lines 118. It will for example cause enhanced neutron scattering if composed of low atomic number nuclei. Alternatively, target materials yielding high X-ray production from neutron interation could possibly be used, the detected scattered energy pulses resulting from beam scanning across the lines 118 being analysed in a similar manner to that described in relation to FIG. 1.

In FIG. 19 an alternative arrangement for sweeping a beam of neutrons is shown, in that a boron shielding block 120 having an aperture 122 is arranged to oscillate as shown by the arrow Y. Incident neutron radiation 124 is reflected by a neutron reflector or moderator lining 128 in the aperture 122 so that a beam 126 of neutrons is swept across the lines 118 as the shielding block 120 is oscillated. The detected scattered energy pulses from the lines 118 are subsequently analysed in a similar manner to that in relation to FIG. 18.

Other ionising radiations such as X-rays could be employed with the line material chosen to yield characteristic scattered X-rays. The X-rays could be produced from a target, and oscillation or displacement of the target could be used to produce a scan of the lines in a similar manner to that aforedescribed. Other radiation might be used that is capable of being focussed or collimated and scanned, and whose scattering characteristics from a target or targets can be distinguished from those of the target surrounds.

I claim:

1. A method of monitoring the position of at least one target on a body, the method comprising projecting a beam of radiation onto a deflector arranged such that said radiation is deflected by the deflector onto the body, repeatedly angularly moving the deflector about a datum axis in a cyclic manner so that the deflected radiation is cyclically scanned across the target and reflected therefrom, receiving the reflected radiation from the target, and analysing the reflected radiation to determine any change in position of the target.

2. A method of monitoring the position of at least one target on a body comprising, repeatedly scanning a beam of radiation across the target, the beam being scanned at a predetermined frequency relative to a datum axis such that the scanned beam traverses a target on said body twice per cycle of scan and produces corresponding pulses of reflected radiation therefrom, receiving the time-separated pulses at a detector means, analyzing the detected radiation, adjusting the datum axis, if necessary, to render the received pulses substantially symmetrical in time, recording the adjusted position of the datum axis associated with the target, subsequently repeating the scan of said target with the scanning datum axis in said adjusted position and detecting any loss of symmetry of the pulses received by the detector means so as to determine any change in position of the target.

3. A method of monitoring the position of a plurality of targets distributed in parallel relationship over a surface of interest, the method comprising repeatedly scanning a beam of radiation across the targets, the targets being initially scanned individually to derive an adjusted scanning datum axis for each target, each adjusted datum axis position being recorded, and subsequently each target being scanned periodically with the scanning datum axis in the adjusted position initially derived for the respective target, receiving reflected radiation from the targets, and analyzing the reflected radiation to determine any change in position of the targets.

4. A method as claimed claim 2, wherein symmetry detection is implemented by a frequency analysis of the output of the detector means, the datum axis of the scanned beam being adjusted to determine the position of adjustment at which the output of the detector means is a minimum over a narrow frequency band containing the frequency of scanning.

5. A method as claimed in claim 1, wherein the scan defines an orbital path.

6. A method as claimed in claim 5, wherein the orbital path comprises a circular path.

7. A method as claimed in claim 1, wherein two or more targets are scanned to produce corresponding pulses in the reflected radiation, and the time delay between said pulses is analysed to determine any change in position of any of the targets.

8. A method as claimed in claim 7, wherein a plurality of targets are provided by at least two lines in mutually perpendicular relationship.

9. A method as claimed in claim 7, wherein a plurality of targets are provided by at least two lines in parallel relationship.

10. A method as claimed in claim 1, wherein asymmetry is detected by pulse timing analysis of the pulses produced as the beam crosses at least one target.

11. A method as claimed in claim 1, wherein two targets are scanned but such that the path of the scan does not completely traverse each said target, whereby changes in position of the targets relative to each other result in changes in reflected radiation pulses from at least one of the targets.

12. A method as claimed in claim 1, wherein the beam of radiation comprises light from a laser source and the target comprises a diffusely reflecting white line stable at temperatures substantially above ambient temperature.

13. A method as claimed in claim 12, wherein the light beam is split with one portion thereof being scanned across the target and the other portion thereof being directed towards and scanning another target.

14. A method as claimed in claim 1, wherein the beam of radiation comprises ultrasound, or neutron radiation, or X-rays.

15. A method of monitoring the position of two targets on a body, comprising repeatedly scanning a beam of radiation across the targets but such that the path of the scan does not completely traverse each said target, changes in position of the targets relative to each other resulting in changes in reflected radiation pulses from at least one of the targets, receiving reflected radiation from the targets, and analysing the reflected radiation, the analysis including comparing the amplitudes of neighbouring reflected radiation pulse energies to derive the degree of asymmetry of the targets from the initial position of the targets so as to determine any change in position of the targets.

16. A method of monitoring the position of two targets on a body and comprising repeatedly scanning a beam of radiation across the two targets but such that the path of the scan does not completely traverse each said target, changes in position of the targets relative to each other resulting in changes in reflected radiation pulses from at least one of the targets, receiving the reflected radiation pulses, analysing the reflected radiation pulses, and subsequently adjusting the datum central position of the scan unit the same reflected radiation is received from each said target to derive the change in position of the targets.

17. Apparatus for monitoring the position of at least one target on a body and comprising, means for projecting a beam of radiation, means for deflecting the projected radiation and towards which deflecting means the beam is arranged to be directed, means for repeatedly angularly moving the deflecting means about a datum axis in a cyclic manner so that said deflected radiation therefrom is cyclically scanned across at least one target and is reflected therefrom, means for receiving said reflected radiation, and means for analysing the reflected radiation to determine any change in position of the target.

18. Apparatus as claimed in claim 17, wherein the scanning means comprises an oscillatory reflector arranged to be driven by a drive input having a generally symmetrical waveform of predetermined frequency, whereby the mean position of oscillation of the reflector defines the datum axis of the beam scan and adjustment of the position of the datum axis is effected by appropriate adjustment of the reflector.

19. Apparatus as claimed in claim 17, wherein the scanning means comprises a plurality of reflectors disposed around a carrier arranged to rotate in a controlled manner.

20. Apparatus as claimed in claim 17, wherein the beam of radiation comprises, light, or neutrons, or rays, or ultrasound.

21. Apparatus as claimed in claim 17, wherein the beam of radiation comprises light from a laser source.

22. Apparatus as claimed in claim 17, wherein the beam of radiation comprises ultrasound, or neutron radiation, or X-rays.

23. Apparatus as claimed in claim 17, including a fibre optical device through which a light beam of radiation is arranged to be passed.

24. Apparatus as claimed in claim 23, including means for displacing the fibre optical device so as to scan the beam.

25. Apparatus as claimed in claim 23, wherein the fibre optical device comprises a fibre optical bundle, and means are provided for switching across the bundle so as to scan the beam.

26. Apparatus as claimed in claim 17, including means for splitting the deflected beam of radiation so that each split portion of the deflected beam can be directed at and scanned across a respective target by said annular moving of the deflecting means.

27. Apparatus for monitoring the position of at least one target and comprising means for directing a beam of radiation towards at least one target on a body, means for scanning the beam at a predetermined frequency across the target, detector means for receiving reflected pulses of radiation from the target whereby the detector means receives two time-separated reflected pulses from the target per cycle of scan, means responsive to the detector means for adjusting the mean position of scanning until the received reflected pulses are substantially equispaced with respect to time, means for recording the adjusted mean position associated with the target whereby the mean position necessary, in a subsequent scan of the target, to attain the equispaced relation of the received pulses can be compared with the recorded mean position, thereby to detect any displacement of the target.

28. Apparatus as claimed in claim 27, wherein the adjusting means is frequency selective and is responsive to the component of the detector means output having a frequency content corresponding to said pre-determined scanning frequency.

29. Apparatus as claimed in claim 28, wherein the adjusting means includes a narrow bandpass filter tuned to said pre-determined frequency and coupled to receive the output of the detector means.

30. Apparatus as claimed in claim 27, wherein the scanning means comprises a reflector, and includes means for oscillating the reflector in a controlled manner.

31. Apparatus as claimed in claim 27, wherein the scanning means comprises at least two reflectors, a rotatable carrier on which the reflectors are disposed, , and includes means for rotating the carrier in a controlled manner so as to scan the beam of radiation in an orbital path.

32. Apparatus as claimed in claim 31, wherein the reflectors are in orthogonal relationship and the reflectors are adapted to be driven with different drive amplitudes so as to describe an elliptical scan.

33. Apparatus as claimed in claim 27, wherein the scanning means is displaceable so as to change the datum central position of the scan.

* * * * *